(12) United States Patent
Rubens et al.

(10) Patent No.: US 11,964,352 B2
(45) Date of Patent: Apr. 23, 2024

(54) MULTI-MOTION ACCESSORY

(71) Applicants: Robert Bosch Tool Corporation, Broadview, IL (US); Robert Bosch GmbH, Stuttgart (DE)

(72) Inventors: Jeremy Rubens, Palatine, IL (US); Arvind Gopi, Prospect Heights, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 334 days.

(21) Appl. No.: 15/896,484

(22) Filed: Feb. 14, 2018

(65) Prior Publication Data
US 2019/0247969 A1    Aug. 15, 2019

(51) Int. Cl.
*B24D 13/20*    (2006.01)
*B23Q 9/00*    (2006.01)
(Continued)

(52) U.S. Cl.
CPC .......... *B23Q 11/00* (2013.01); *B23Q 9/0035* (2013.01); *B24B 45/003* (2013.01); *B24D 13/20* (2013.01); *F16D 3/04* (2013.01)

(58) Field of Classification Search
CPC ....... B24B 23/00; B24B 23/02; B24B 45/003; B23Q 9/0035; B24D 13/20; F16D 3/04
(Continued)

(56) References Cited

U.S. PATENT DOCUMENTS 3,482,362 A * 12/1969 Bangerter ............ B23Q 1/5468
451/357
4,610,111 A * 9/1986 Cox ........................ B24B 23/02
279/6

(Continued)

FOREIGN PATENT DOCUMENTS

EP    0157532    10/1985
GB    2268428    1/1994
(Continued)

OTHER PUBLICATIONS

GB Search Report for GB1901999.1.

*Primary Examiner* — Brian D Keller
*Assistant Examiner* — Marcel T Dion
(74) *Attorney, Agent, or Firm* — Kathy Takeguchi; Maginot, Moore & Beck LLP

(57) ABSTRACT

An accessory includes an attachment member, a fastener, a locking member, and an eccentric member. The attachment member has a central axis, which is perpendicular to a first surface of the attachment member. The fastener is connected to at least the attachment member. The locking member is movable into at least (a) a locked position in which the locking member is engaged with the attachment member such that the attachment member is configured to rotate about the central axis, and (b) an unlocked position in which the locking member is disengaged from the attachment member such that the attachment member is configured to rotate about an eccentric axis. The eccentric axis is offset from the central axis. The eccentric member includes a first slot that receives the locking member, a second slot that receives the driving shaft, and a third slot that receives the fastener. The second slot of the eccentric member is structured to align with the central axis of the attachment mem-
(Continued)

ber. The third slot of the eccentric member is structured to align with the eccentric axis of the attachment member.

20 Claims, 5 Drawing Sheets

(51) Int. Cl.
  *B23Q 11/00* (2006.01)
  *B24B 45/00* (2006.01)
  *F16D 3/04* (2006.01)

(58) Field of Classification Search
  USPC .................................. 451/344, 357, 359, 442
  See application file for complete search history.

(56) References Cited

U.S. PATENT DOCUMENTS

| | | | |
|---|---|---|---|
| 5,040,340 A * | 8/1991 | Bischof | ................... B24B 23/03 451/343 |
| 5,885,146 A | 3/1999 | Cockburn | |
| 6,159,084 A | 12/2000 | Tiede | |
| 6,475,066 B2 * | 11/2002 | Panagian | ................. B24B 23/03 451/28 |
| 6,878,049 B2 * | 4/2005 | Heidelberger | ........ B24B 23/026 277/609 |
| 7,033,262 B2 * | 4/2006 | Takizawa | ............... B24D 9/085 451/490 |
| 2009/0209182 A1 * | 8/2009 | Lampka | ................. B24B 23/028 451/357 |
| 2010/0151775 A1 | 6/2010 | Lampka | |
| 2011/0159789 A1 * | 6/2011 | Park | ...................... B24B 45/006 451/344 |
| 2017/0312877 A1 * | 11/2017 | Valentini | ................. B24B 23/02 |
| 2019/0084116 A1 * | 3/2019 | Hafele | ................... B24B 23/04 |

FOREIGN PATENT DOCUMENTS

| | | |
|---|---|---|
| GB | 2420519 | 5/2006 |
| WO | 02068151 | 9/2002 |

* cited by examiner

MULTI-MOTION ACCESSORY

FIELD OF THE INVENTION

This disclosure relates generally to accessories, and more particularly to attachment assemblies for power tools.

BACKGROUND

In general, there are some power tools that can be used for cleaning. However, these power tools have a number of drawbacks. For example, these power tools may be limited to a particular type of motion or may have relatively complex drive units and/or mechanical structures to provide more than one type of motion.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, an accessory includes an attachment member, a fastener, a locking member, and an eccentric member. The attachment member has a central axis, which is perpendicular to a first surface of the attachment member. The fastener is connected to at least the attachment member. The locking member is movable into at least (a) a locked position in which the locking member is engaged with the attachment member such that the attachment member is configured to rotate about the central axis, and (b) an unlocked position in which the locking member is disengaged from the attachment member such that the attachment member is configured to rotate about an eccentric axis. The eccentric axis is offset from the central axis. The eccentric member includes a first slot that receives the locking member, a second slot that receives a driving shaft, and a third slot that receives the fastener. The second slot of the eccentric member is structured to align with the central axis of the attachment member. The third slot of the eccentric member is structured to align with the eccentric axis of the attachment member.

In an example embodiment, an apparatus includes at least a driving shaft, a motor, and an accessory. The motor is configured to drive the driving shaft. The accessory is drivable by the driving shaft. The accessory includes an attachment member, a fastener, a locking member, and an eccentric member. The attachment member has a central axis, which is perpendicular to a first surface of the attachment member. The fastener is connected to at least the attachment member. The locking member is movable into at least (a) a locked position in which the locking member is engaged with the attachment member such that the attachment member is configured to rotate about the central axis, and (b) an unlocked position in which the locking member is disengaged from the attachment member such that the attachment member is configured to rotate about an eccentric axis. The eccentric axis is offset from the central axis. The eccentric member includes a first slot that receives the locking member, a second slot that receives the driving shaft, and a third slot that receives the fastener. The second slot of the eccentric member is structured to align with the central axis of the attachment member. The third slot of the eccentric member is structured to align with the eccentric axis of the attachment member.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1A:
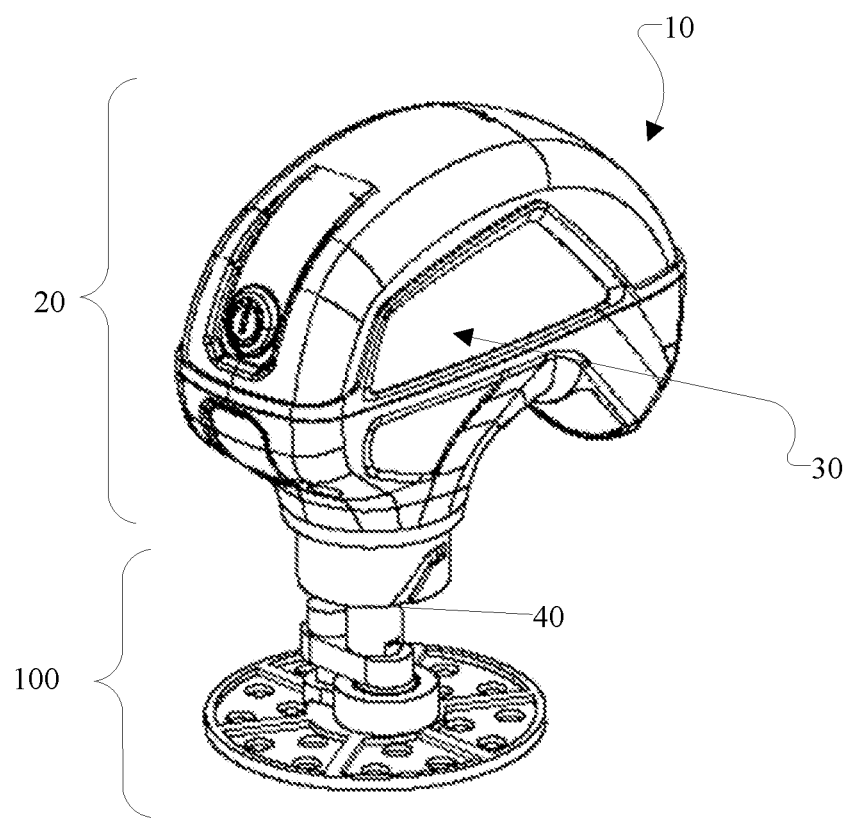
FIG. 1A is a perspective view of a power tool with a multi-motion accessory according to an example embodiment of this disclosure.
Figure 1B:
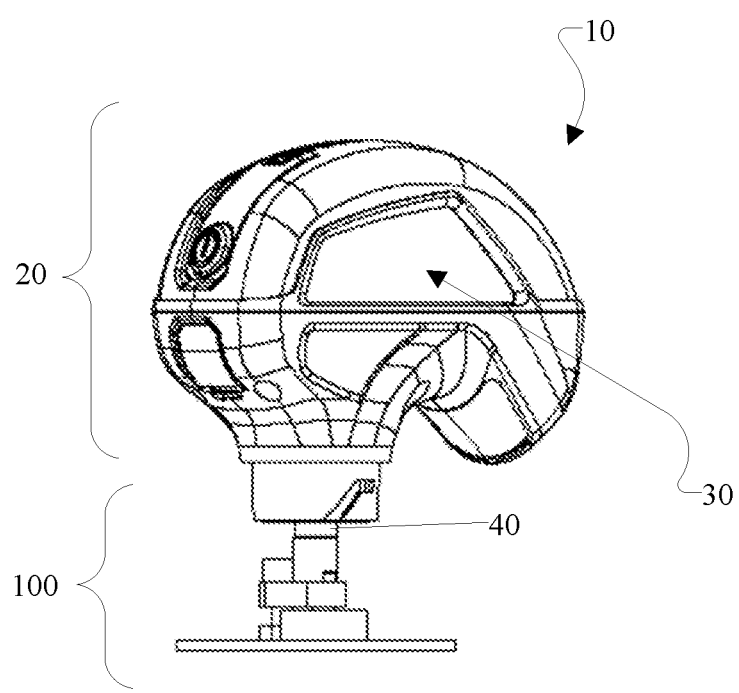
FIG. 1B is another perspective view of a power tool with a multi-motion accessory according to an example embodiment of this disclosure.

FIGS. 1A and 1B are perspective views of an apparatus 10. In an example embodiment, the apparatus 10 is a power tool 20 with a multi-motion accessory 100. In an example embodiment, the power tool 20 is hand-held and portable. In an example embodiment, the power tool 20 includes a motor 30, which is disposed within a housing of the power tool 20 and is thus not explicitly visible in FIGS. 1A and 1B. In an example embodiment, the motor 30 is configured to drive the multi-motion accessory 100 via a driving shaft 40 that is connected to the motor 30. In an example embodiment, when driven by the motor 30, the driving shaft 40 provides a rotary motion. In an example embodiment, the multi-motion accessory 100 is connectable to a part of the driving shaft 40 that extends beyond the housing of the power tool 20. In an example embodiment, as shown in FIGS. 1A and 1B, the multi-motion accessory 100 is separate from and external to the housing of the power tool 20. Also, in an example embodiment, the multi-motion accessory 100 is attachable and detachable from the power tool 20.

In an example embodiment, the multi-motion accessory 100 is configured to provide a plurality of modes corresponding to a plurality of motions upon being driven by the driving shaft 40. For instance, in an example embodiment, the multi-motion accessory 100 is configured to provide at least a first mode that includes a spinning motion and second mode that includes a random orbital motion. Also, in an example embodiment, the multi-motion accessory 100 is configured to provide a third mode that includes an orbital motion. Accordingly, the multi-motion accessory 100 is advantageous in being able to provide various modes with various motions via the driving shaft 40 of the power tool 20 without having to include other driving components in the driving unit of the power tool 20 to achieve these different motions.

Figure 2:
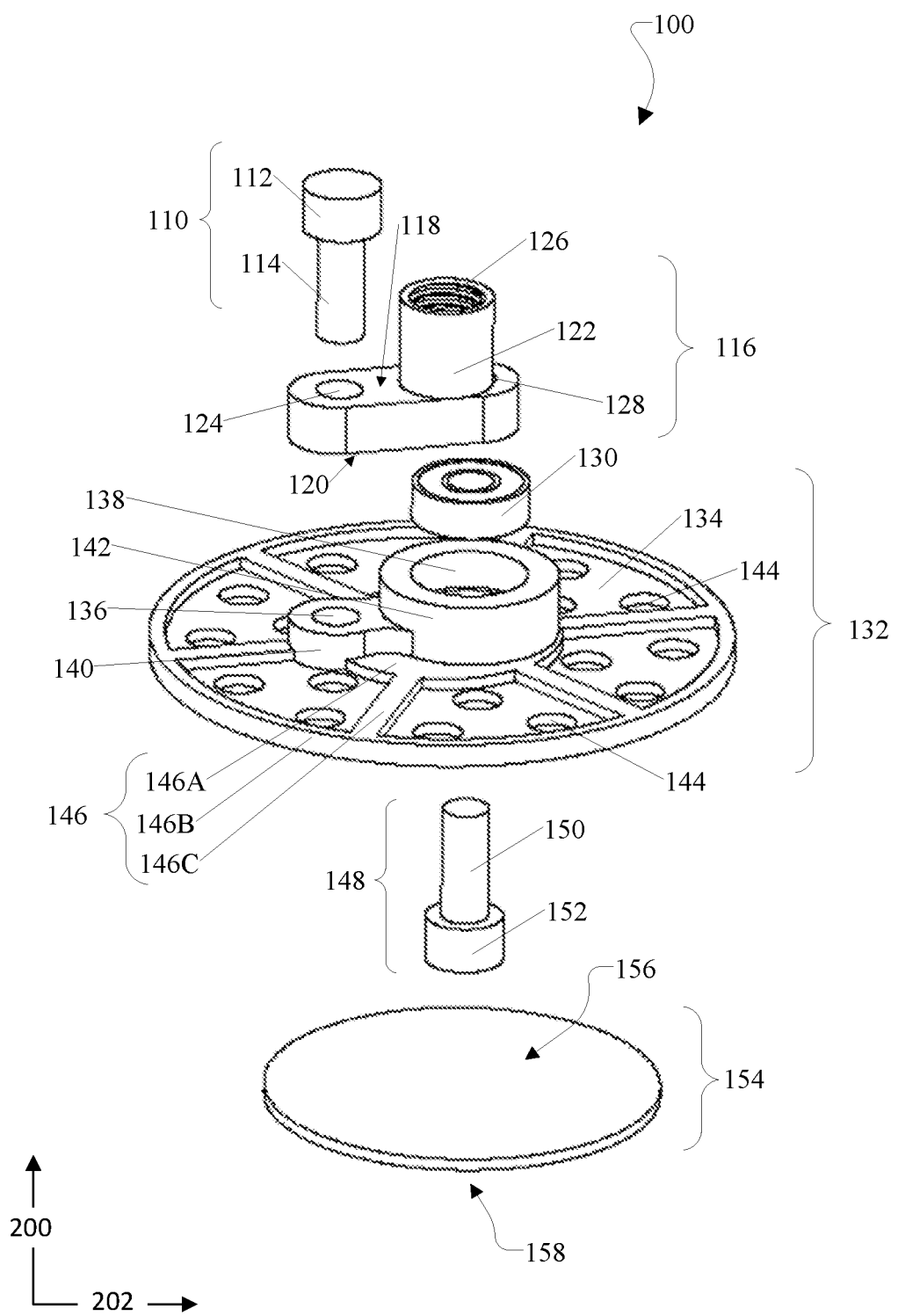
FIG. 2 is an exploded view of a multi-motion accessory according to an example embodiment of this disclosure.

FIG. 2 is a perspective view of the multi-motion accessory 100 according to an example embodiment. In an example embodiment, as shown in FIG. 2, the multi-motion accessory 100 includes at least a locking member 110, an eccentric member 116, a bearing 130, an attachment member 132, and a fastener 148. Also, as shown in FIG. 2, the multi-motion accessory 100 is structured to accommodate an attachment 154. In an example embodiment, the locking member 110 is configured to provide a locked state and an unlocked state between the eccentric member 116 and the attachment member 132. Also, in an example embodiment, the locking member 110 is structured and/or positioned to counter or compensate for a load imbalance created, for example, by at least the bearing 130, the attachment member 132, the fastener 148, the attachment 154, or any combination thereof In an example embodiment, the locking member 110 is connected to and supported by the eccentric member 116. In an example embodiment, the locking member 110 is a lock screw, a lock pin, a post, or any suitable fastener. For instance, in FIG. 2, the locking member 110 is an elongated fastener that includes at least a head portion 112 and a shaft portion 114. In an example embodiment, the locking member 110 comprises a plastic material, a metal material, a suitable material, or any combination thereof. In an example embodiment, the head portion 112 is configured to abut against a surface 118 of the eccentric member 116 such that the head portion 112 functions as a stopper. Also, in an example embodiment, the shaft portion 114 is structured to pass through a first slot 124 of the eccentric member 116. The shaft portion 114 has a length that is longer than a thickness of the eccentric member 116 along a vertical axis 200 to enable the locking member 110 to interact with a locking portion 140 of the attachment member 132. As a reference, the vertical axis 200 is perpendicular to a horizontal axis 202, as shown in FIG. 2.

In an example embodiment, the eccentric member 116 comprises at least one mechanical structure, which is configured to interact with at least the locking member 110, the driving shaft 40, and the fastener 148. Also, in an example embodiment, the eccentric member 116 is structured as a distinct unitary device that functionally connects at least the locking member 110, the driving shaft 40, and the fastener 148. In an example embodiment, the eccentric member 116 comprises a plastic material, a metal material, any suitable material, or any combination thereof. For instance, in FIG. 2, the eccentric member 116 comprises at least one plastic material. Also, in an example embodiment, as shown in FIG. 2, the eccentric member 116 is constructed with a plurality of slots including at least a first slot 124, a second slot 126, and a third slot 128. In an example embodiment, the plurality of slots is arranged on the eccentric member 116 such that a longitudinal axis (or center axis) of the second slot 126 is between a longitudinal axis (or center axis) of the first slot 124 and a longitudinal axis (or center axis) of the third slot 128 along the surface 118 of the eccentric member 116, thereby positioning at least a part of the driving shaft 40 between the locking member 110 and the fastener 148. As a reference, in FIG. 2, the longitudinal axes (or center axes) of the first slot 124, the second slot 126, and the third slot 128 are parallel to the vertical axis 200.

In an example embodiment, the distances between each of the plurality of slots can vary provided that they are able to provide the functions described herein. For instance, in FIG. 2, a distance between the second slot 126 and the third slot 128 is closer than a distance between the first slot 124 and the second slot 126. With this slot arrangement, the driving shaft 40 is positioned closer to the fastener 148 than the locking member 110. Also, in an example embodiment, since the second slot 126 is disposed within the support post 122 of the eccentric member 116 and adjacent to the surface 118, as shown in FIG. 2, this feature enables at least a portion of the second slot 126 to overlap at least a portion of the third slot 128 while maintaining an offset between the longitudinal axis of the second slot 126 and the longitudinal axis of the third slot 128. This arrangement is advantageous in reducing vibrations of the attachment member 132 when driven by the driving shaft 40 while also providing a space-saving effect. In addition, the distance between the first slot 124 and the second slot 126 is set in relation to at least the distance between the second slot 126 and the third slot 128 and/or considerations associated with ensuring that the multi-motion accessory 100 operates in a balanced and controlled manner.

In an example embodiment, the first slot 124 is structured to receive the locking member 110. In an example embodiment, the first slot 124 is defined from one surface 118 on a first side of the eccentric member 116 to an opposite surface 120 on a second side of the eccentric member 116. In this regard, for example, the first slot 124 comprises a through-hole in the eccentric member 116, as shown in FIG. 2. In an example embodiment, the first slot 124 is structured to receive at least a part of the shaft portion 114 of the locking member 110. In an example embodiment, the first slot 124 is structured to include minimal and sufficient clearance such that the locking member 110 is supported by the eccentric member 116 and movable into a locked position and an unlocked position. In this regard, for instance, the locking member 110 is movable along the vertical axis 200 within the first slot 124.

In an example embodiment, the second slot 126 is structured to receive the driving shaft 40 of the power tool 20. For instance, in FIG. 2, the second slot 126 is defined within a support post 122, which is a cylindrical structure that protrudes outward from the surface 118 of the eccentric member 116. In this regard, the opening for the second slot 126 is on a different plane than the opening for the first slot 124 and the opening for the third slot 128. Also, in an example embodiment, as shown in FIG. 2, the driving shaft 40 is positioned on a first side of the eccentric member 116 while the bearing 130 and the attachment member 132 are positioned on a second side of the eccentric member 116. Also, in an example embodiment, the second slot 126 includes threads, which are provided within an interior surface of the support post 122 so that the driving shaft 40 is connected to the eccentric member 116 in a secure manner.

In an example embodiment, the third slot 128 is structured to receive the fastener 148. More specifically, in an example embodiment, the third slot 128 is structured to engage with the fastener 148 such that the attachment member 132 and the bearing 130 are secured to the eccentric member 116. In an example embodiment, the third slot 128 is defined from the surface 118 on the first side of the eccentric member 116 to the opposite surface 120 on the second side of the eccentric member 116. In this regard, for example, the third slot 128 comprises a through-hole in the eccentric member 116, as shown in FIG. 2. Alternatively, the third slot 128 can be a groove or a cavity in the eccentric member 116 with at least an opening that faces the attachment member 132. In an example embodiment, the third slot 128 is structured to receive the fastener 148 in any suitable orientation (e.g., first orientation with shaft portion 150 above head portion 152 or second orientation with head portion 152 above shaft portion 150).

In an example embodiment, the bearing 130 is any suitable type of bearing, device, or agent that reduces friction to facilitate a movement of the attachment member 132 in relation to the eccentric axis 400. In FIG. 2, for instance, the bearing 130 is a roller bearing or a plain bearing (e.g., a bushing). In an example embodiment, the bearing 130 is centered about the eccentric axis 400. In an example embodiment, the bearing 130 is positioned adjacent to the surface 120 of the eccentric member 116. Also, in an example embodiment, the bearing 130 is disposed within a guide slot 138 of an attachment portion 142 of the attachment member 132. In an example embodiment, the bearing 130 includes a center region with a through-hole that is configured to receive the fastener 148. In an example embodiment, the bearing 130 is concentric with at least the fastener 148 to enable the attachment member 132 to move relative to the eccentric axis 400.

In an example embodiment, the attachment member 132 is structured to receive and hold an attachment 154 via any suitable fastening means or adhesive means. In this regard, the attachment member 132 is a mechanical structure, which comprises a plastic material, any suitable material, or any combination thereof. As a non-limiting example, in FIG. 2, both the attachment member 132 and its attachment 154 have matching and/or corresponding shapes, particularly a circular or round shape in plan view. In addition, the attachment 154 is attachable and detachable from the attachment member 132. For instance, the attachment 154 is a surface treating member, such as a cleaning pad, a sanding pad, a grinding pad, a sponge, a polishing pad, a brush, an abrasive material, any suitable object, or any combination thereof. As a non-limiting example, in FIG. 2, the attachment 154 is a scrubbing pad, which is attachable to and detachable from the attachment member 132 via fabric hook and loop fasteners. In this regard, for instance, the fabric hook/loop fasteners are disposed on a first side 156 of the attachment 154 to engage with corresponding fabric hook/loop fasteners on a second side of the attachment member 132. Also, in this non-limiting example, a scrubbing surface is disposed on a second side 158 of the attachment 154 to engage with the work piece.

Figure 3:
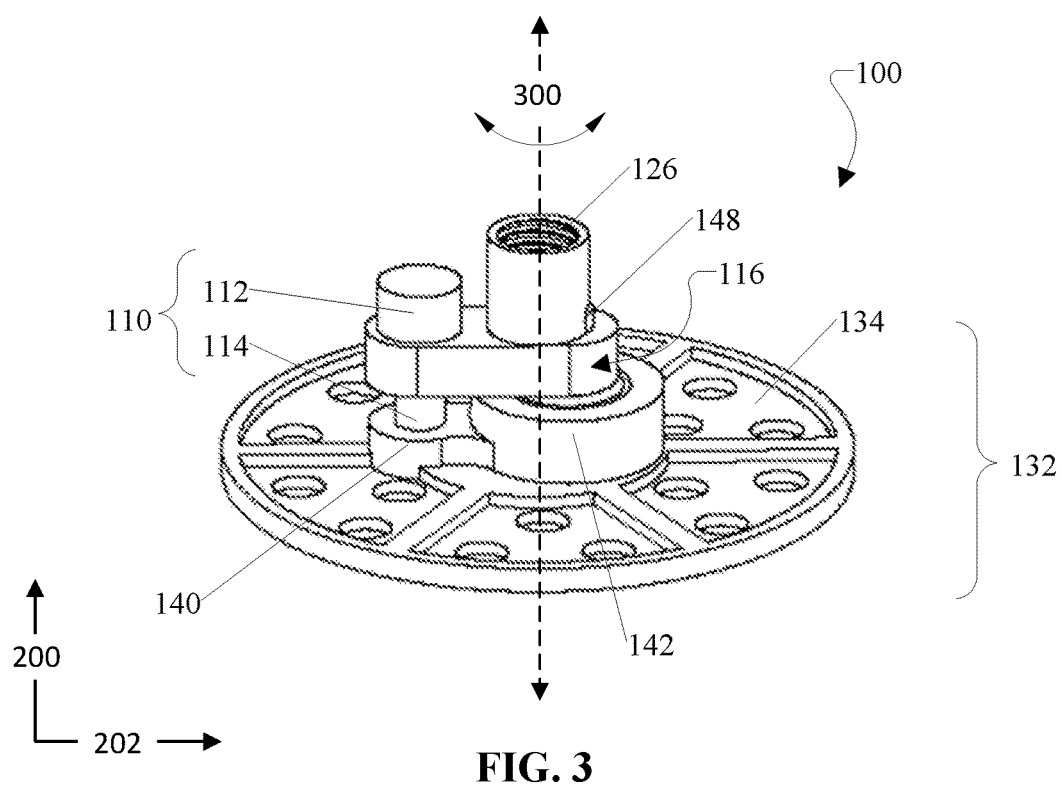
FIG. 3 is a perspective view of a multi-motion accessory in a locked state according to an example embodiment of this disclosure.

In an example embodiment, the attachment member 132 includes an inner region. In FIG. 2, for instance, the inner region is supported and enclosed by an inner rib 146A. In an example embodiment, the inner region includes a central axis 300 of the attachment member 132. As shown in FIG. 3, the central axis 300 is perpendicular to at least a surface 134 of the attachment member 132. In addition, the central axis 300 extends parallel to the vertical axis 200. In an example embodiment, the central axis 300 of the attachment member 132 aligns with at least a longitudinal axis or a drive axis of the driving shaft 40 via the second slot 126 of the eccentric member 116 when the locking member 100 is in the locked state. Also, in an example embodiment, the inner region includes at least the locking portion 140 and the attachment portion 142.

In an example embodiment, the locking portion 140 is structured to interact with the locking member 110. To enable this interaction, the locking portion 140 and the first slot 124 are configured to align. In an example embodiment, the locking portion 140 includes a locking slot 136, which is structured to receive the locking member 110 such that the attachment member 132 is secured to eccentric member 116. In FIG. 2, for instance, the locking portion 140 includes a mechanical structure, such as a post, which protrudes outward from the surface 134 and includes the locking slot 136. In an example embodiment, the locking portion 140 is offset from the central axis 300 of the attachment member 132. In addition, the locking portion 140 is positioned adjacent to the attachment portion 142 along the surface 134 of the attachment member 132.

In an example embodiment, the attachment portion 142 is structured to receive the fastener 148, which connects the attachment member 132 to the eccentric member 116. Also, in an example embodiment, the attachment portion 142 is structured to receive the bearing 130 to facilitate a movement of the attachment member 132 with respect to the eccentric axis 400. Turning to FIG. 2, as an example, the attachment portion 142 includes a guide slot 138, which is structured to receive the bearing 130 on the surface 134 and/or on a first side of the attachment member 132. In this example, the bearing 130 can be positioned and/or press-fit into the guide slot 138. In addition, as shown in FIG. 2, the guide slot 138 and the bearing 130 include through-holes, which are structured to receive at least a shaft portion 150 of the fastener 148. Also, in an example embodiment, the attachment portion 142 includes a mechanical structure, such as a post, which protrudes outward from the surface 134 and includes the guide slot 138. In an example embodiment, the attachment portion 142 (or a longitudinal axis or center axis thereof) is offset from the central axis 300 of the attachment member 132. More specifically, as shown in FIG. 2, the attachment portion 142 is structured to align with at least the third slot 128 to enable the fastener 148 to connect the attachment member 132 to the eccentric member 116 or connect both the attachment member 132 and the bearing 130 to the eccentric member 116.

In an example embodiment, the attachment member 132 includes an outer region that surrounds the inner region. In this regard, for instance, the outer region extends from the inner rib 146A to the outer rib 146B. In an example embodiment, as shown in FIG. 2, the outer rib 146B is positioned at an edge portion of the attachment member 132. In an example embodiment, the outer region provides additional surface area for an attachment 154 (e.g., a surface treating member) while being durable, light-weight, and inexpensive. In an example embodiment, the outer region includes a plurality of through-holes 144. The plurality of through-holes 144 are structured to prevent a load imbalance, thereby preventing any undesirable or unwanted vibrations in the attachment member 132. The through-holes 144 are also advantageous, for example, in at least reducing the weight, material, and cost of the attachment member 132.

In an example embodiment, the plurality of ribs 146 provide support and rigidity to the attachment member 132. For example, as shown in FIG. 2, the plurality of ribs 146 are provided at least on the surface 134 of the attachment member 132. In an example embodiment, the plurality of ribs 146 includes at least the inner rib 146A and the outer rib 146B. In an example embodiment, the inner rib 146A extends around the inner region of the attachment member 132 while the outer rib 146B extends around the edge portion of the attachment member 132. Also, in an example embodiment, the plurality of ribs 146 includes one or more radial ribs 146. In an example embodiment, as shown in FIG. 2, the radial ribs 146 extend from at least the inner rib 146A to the outer rib 146B. Also, in an example embodiment, the radial ribs 146 are uniformly spaced from each other along the surface 134 of the attachment member 132.

In an example embodiment, the fastener 148 is any suitable mechanical fastening device, which is structured to connect the attachment member 132 to the eccentric member 116. Also, in an example embodiment, the fastener 148 is structured to connect at least the bearing 130 to the eccentric member 116 and the attachment member 132. For example, in FIG. 2, the fastener 148 includes at least a head portion 152 and a shaft portion 150. In an example embodiment, when in the first orientation, the head portion 152 is configured to abut against a portion of the attachment member 132 to connect the attachment member 132 to at least the eccentric member 116 and/or the bearing 130. In an example embodiment, the shaft portion 150 is configured to pass through the corresponding through-holes of the attachment portion 132 and the bearing 130. In addition, the shaft portion 150 is structured to engage with the third slot 128.

FIG. 3 is a perspective view of the multi-motion accessory 100 in the locked state according to an example embodiment. In an example embodiment, to transition to the locked state, the eccentric member 116 is moved and/or positioned about the eccentric axis 400 such that the locking member 110 is aligned with the locking slot 136. In this regard, the first slot 124 is aligned with the locking slot 136. In addition, to transition to the locked state, the locking member 110 is moved along the vertical axis 200 in a direction towards the locking slot 136 such that the locking member 110 becomes fully engaged with the locking slot 136. When in the locked state, the locking member 110 secures the eccentric member 116 to the attachment member 132. More specifically, in FIG. 3, the locking member 110 has its shaft portion 114 secured within the locking portion 140 of the attachment member 132. Accordingly, in this locked state, the power tool 20 is configured to drive the multi-motion accessory 100 such that the attachment member 132 moves relative to the central axis 300, which is aligned with the drive axis of the driving shaft 40.

Figure 4:
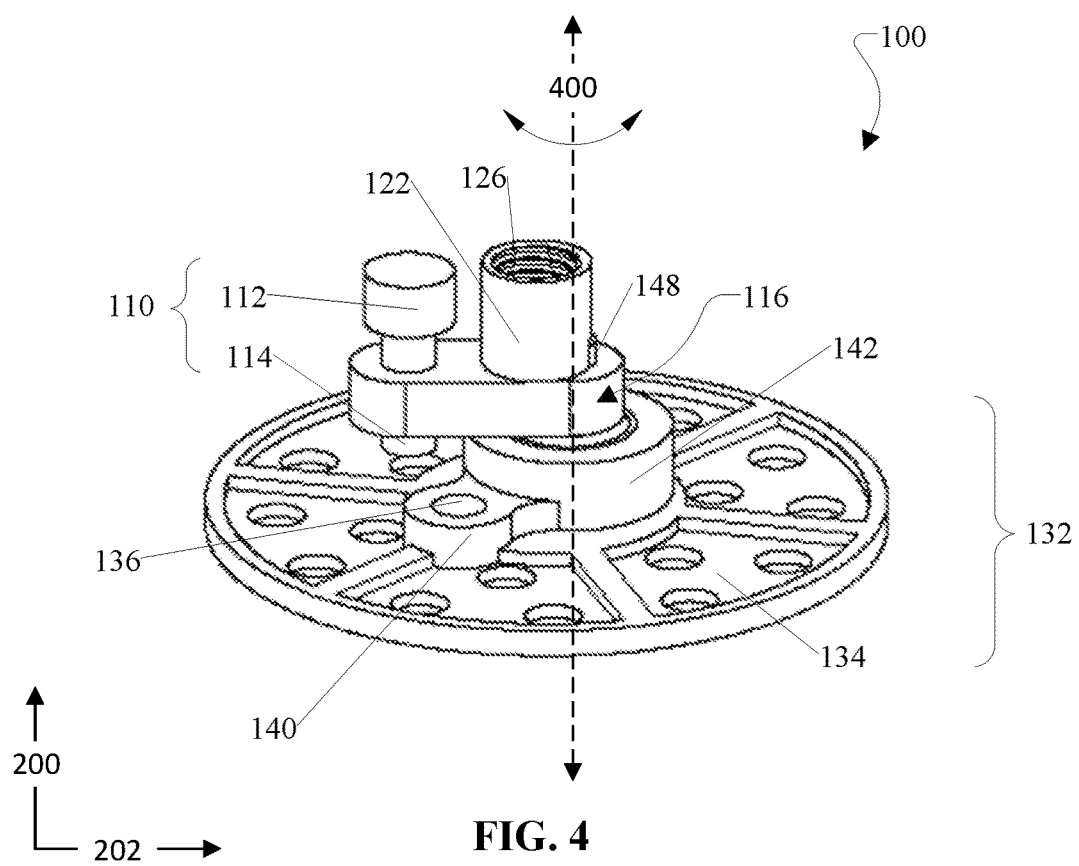
FIG. 4 is a perspective view of a multi-motion accessory in an unlocked state according to an example embodiment of this disclosure.

FIG. 4 is a perspective view of the multi-motion accessory 100 in the unlocked state according to an example embodiment. In an example embodiment, to transition to the unlocked state, the locking member 110 is moved along the vertical axis 200 in a direction away from the locking slot 136 such that the locking member 110 becomes fully disengaged from the locking slot 136. In this regard, the locking member 110 is spaced from the locking slot 136, as shown in FIG. 4. In addition, the eccentric member 116 can be moved and/or positioned about the eccentric axis 400 such that the locking member 110 is not aligned with the locking slot 136. For instance, in FIG. 4, the first slot 124 is not aligned with the locking portion 140. When in the unlocked state, the locking member 110 has its shaft portion 114 disengaged from the locking portion 140 of the attachment member 132. Accordingly, in this unlocked state, the power tool 20 is configured to drive the multi-motion accessory 100 such that the attachment member 132 is free to move relative to at least the eccentric axis 400, which is offset from the central axis 300 (and hence offset from the drive axis of the driving shaft 40).

Figure 5:
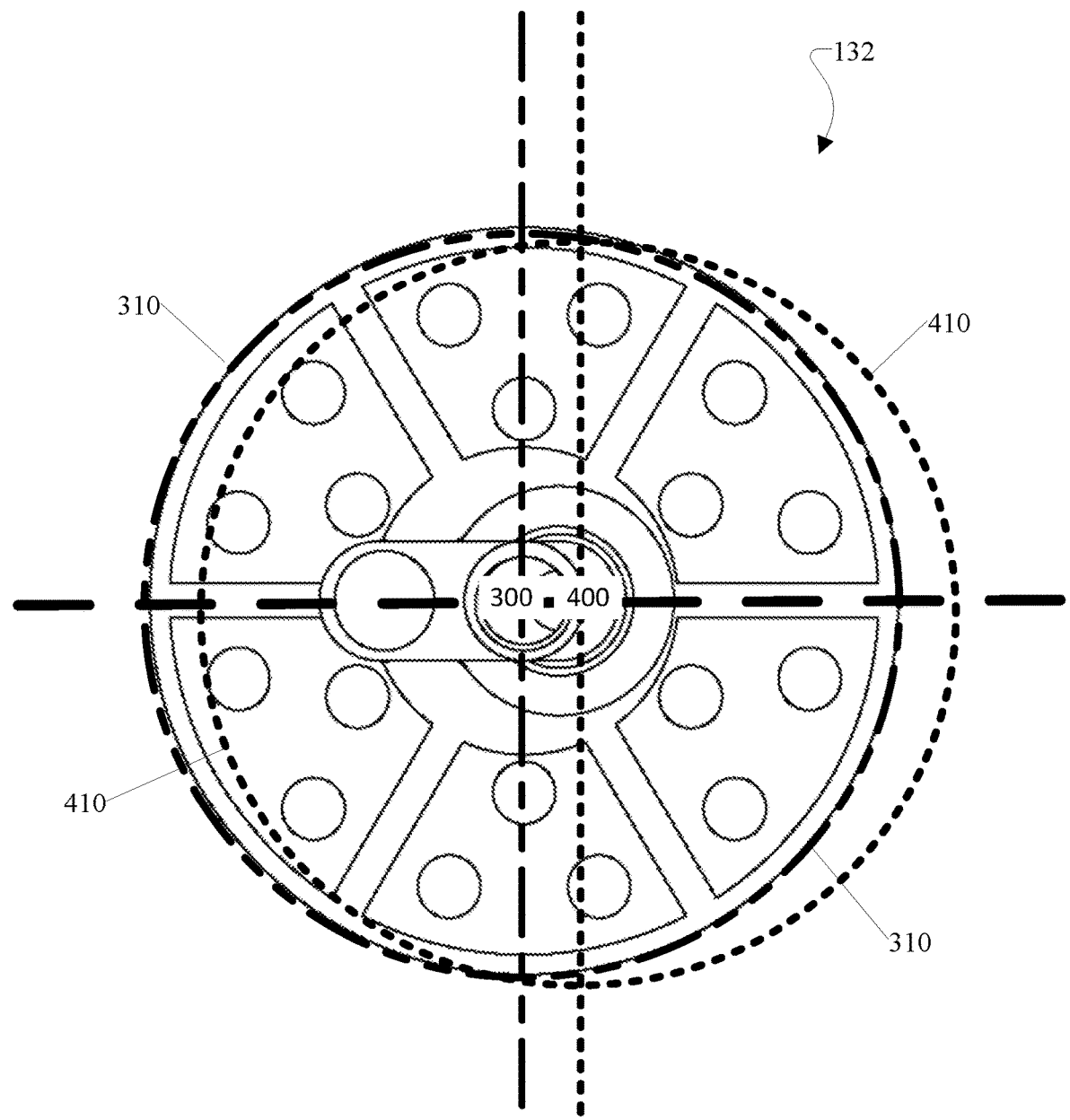
FIG. 5 is a diagram of a path of a multi-motion accessory in a first mode and a path of the multi-motion accessory in a second mode according to an example embodiment of this disclosure.

FIG. 5 is a diagram of at least one path 310 of the multi-motion accessory 100 in the first mode and at least one path 410 of the multi-motion accessory 100 in the second mode according to an example embodiment. In this example, the multi-motion accessory 100 is in the first mode when the locking member 110 is in the locked state. In this first mode, the attachment member 132 moves or rotates relative to the central axis 300 (or the drive axis of the driving shaft 40 due to its alignment with the central axis 300). Also, in this example, the multi-motion accessory 100 is in the second mode when the locking member 110 is in the unlocked state. In this second mode, the attachment member 132 moves or rotates relative to at least the eccentric axis 400. In this regard, as shown in FIG. 5, the path 410 of the second mode, which is associated with at least the eccentric axis 400, is offset from the path 310 of the first mode, which is associated with the central axis 300.

In an example embodiment, the first mode comprises a spinning motion in which the locking member 110 is in the locked state with the attachment member 132. In this first mode, the multi-motion accessory 100 is configured to move the attachment member 132 according to the path 310. In this regard, for instance, the attachment member 132 and/or path 310 is concentric with the central axis 300 (or the drive axis), thereby enabling the attachment member 132 to rotate in a circular, balanced manner when driven by the driving shaft 40. Also, in an example embodiment, a speed of the attachment member 132 during a spinning motion of the first mode is greater than a speed of the attachment member 132 during a random orbital motion of the second mode. With this greater speed, this first mode is advantageous in providing a more aggressive surface action on a work piece than that of the second mode. In an example embodiment, in the locked state, the attachment member 132 is configured to move with respect to the central axis 300 of the attachment member 132 (and/or the drive axis of the driving shaft 40 due to the alignment of the second slot 126 with the central axis 300). When in the locked state, the attachment member 132 is locked (and thus constrained) from moving relative to the eccentric axis 400.

In an example embodiment, the second mode comprises a random orbital motion in which the locking member 110 is in the unlocked state with the attachment member 132. In this second mode, the multi-motion accessory 100 is configured to move the attachment member 132 in accordance with at least the path 410. In this regard, for instance, the attachment member 132 and/or path 410 is offset and therefore not concentric with the central axis 300 (or drive axis). Also, in an example embodiment, a speed of the attachment member 132 during a random orbital motion of the second mode is less than a speed of the attachment member 132 during a spinning motion of the first mode. With this lesser speed, this second mode is advantageous in providing a less aggressive surface action on a work piece than that of the second mode, thereby preventing motion streaks on the work piece in some cases. In an example embodiment, in the unlocked state, the attachment member 132 is free to rotate with respect to at least the eccentric axis 400.

Figure 6:
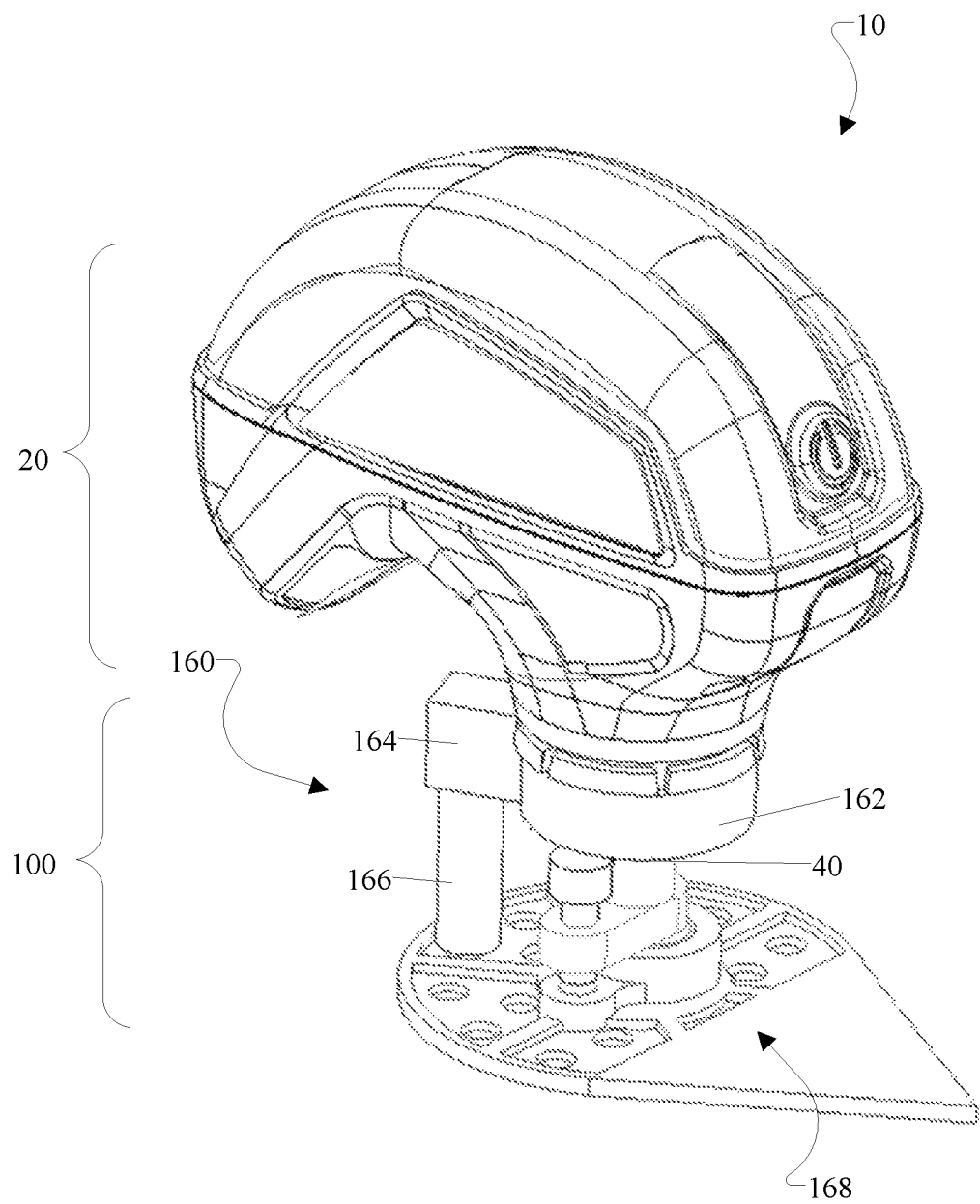
FIG. 6 is a perspective view of a power tool with a multi-motion accessory that includes a constraint mechanism according to an example embodiment of this disclosure.

FIG. 6 is a perspective view of the apparatus 10, which includes the power tool 20 with the multi-motion accessory 100 that further comprises a constraint mechanism 160 according to an example embodiment. In an example embodiment, the constraint mechanism 160 comprises a rubber material, a plastic material, any suitable material, or any combination thereof. For example, in FIG. 6, the constraint mechanism 160 comprises a flexible rubber material such that the attachment member 168 is constrained from spinning yet movable in an orbital motion or a sanding/scrubbing motion. In an example embodiment, when the constraint mechanism 160 is attached to at least an end portion of the power tool 20 and engaged with the corresponding attachment member 132/168, the multi-motion accessory 100 is configured to provide a third mode, which includes at least an orbital motion, a sanding motion, or another type of motion. Also, as shown in FIG. 6, when the constraint mechanism 160 is engaged to hold a part of the attachment member 168, the multi-motion accessory 100 has its locking member 110 in the unlocked state so that the attachment member 168 moves in an orbital motion (or a sanding motion) and provides a third mode when driven by the driving shaft 40.

In an example embodiment, the constraint mechanism 160 includes a connector portion 162, a support member 164, and a constraint device 166. The connector portion 162, the support member 164, and the constraint device 166 are integral or fixedly connected to each other. In an example embodiment, the connector portion 162 is attachable and detachable from the power tool 20. In an example embodiment, when attached, the constraint mechanism 160 has its connector portion 162 secured to an end portion of the power tool 20 near the driving shaft 40. In an example embodiment, the support member 164 supports the constraint device 166 with respect to the connector portion 162. In an example embodiment, the constraint device 166 includes any suitable mechanical device that is structured to constrain a corresponding part of the attachment member 168. For instance, as shown in FIG. 6, the constraint device 166 includes a post, which is configured to hold at least a part of the attachment member 168 such that the attachment member 132 moves in an orbital motion when driven by the driving shaft 40.

In an example embodiment, the attachment member 168 includes a shape that comprises a round portion joined with a triangular portion, as shown in FIG. 6. With this shape and/or the inclusion of a delta pad, the attachment member 168 is well suited for corner regions, edge regions, and the like of a work piece. Also, in an example embodiment, the attachment member 168 can also include a mating structure (e.g., post, hole, recess, etc.), which is configured to position, hold, support, and/or engage with the constraint device 166. In FIG. 6, the attachment member 168 is shown in relation to an orbital motion of the third mode. Alternatively, if desired, the attachment member 132 can be used in this third mode with the constraint mechanism 160. In this regard, the multi-motion accessory 100 can include any suitable attachment member in any of the various modes.

As described above, the multi-motion accessory 100 provides a number of advantageous features, as well as benefits. For example, the multi-motion accessory 100 provides various motions that are obtainable by the same driving shaft 40. In this regard, for instance, the power tool 20 can include a relatively low-cost drive unit with a rotational driving shaft 40 that can provide a variety of motions via the multi-motion accessory 100. Also, since the multi-motion accessory 100 is able to provide these different motions, the drive unit of the power tool 20 does not have to include additional drive components to provide these different motions. In addition, the multi-motion accessory 100 is structured to transition from one mode with one type of motion (e.g., spinning motion) to another mode with another type of motion (e.g., random orbital motion) by simply moving the locking member 110 from one position (e.g., locked position) to another position (e.g., unlocked position), or vice versa. In addition, in an example embodiment, the multi-motion accessory 100 includes a constraint mechanism 160, which is attachable to the power tool 20, to provide yet another mode with another type of motion (e.g., orbital motion). Advantageously, the multi-motion accessory 100 enables a user to apply a desired motion from a selection of different motions to a work piece to achieve desired results with ease.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. Air accessory drivable by a driving shaft, the accessory comprising:
   an attachment member including (a) an inner region including a surface having (i) a first protruding structure that protrudes outward from the surface on a flat side of the attachment member in a first direction and defines a locking slot that is offset from a central axis of the attachment member and (ii) a second protruding structure that protrudes outward from the surface in the first direction and defines a guide slot that is offset from the central axis of the attachment member, the central axis being perpendicular to the surface of the attachment member and (b) an outer region including the surface that extends from the inner region to an edge of the attachment member;
   an attachment configured to engage with a work piece, the attachment being detachably attachable to a second side of the attachment member;
   a fastener;
   a locking member movable into at least (a) a locked position in which the locking member is engaged with the locking slot of the attachment member such that the attachment member is configured to rotate about the central axis, and (b) an unlocked position in which the locking member is disengaged from the locking slot of the attachment member such that the attachment member is configured to rotate about an eccentric axis, the eccentric axis being offset from the central axis; and
   an eccentric member having a first side surface and a second side surface, the eccentric member including (a) a first slot that is defined as a through-hole from the first side surface to the second side surface, the first slot being structured to receive the locking member at least along a first axis that is central to the first slot, (b) a second slot that receives the driving shaft at least along a second axis that is central to the second slot, and (c) a third slot that is defined from the first side surface to the second side, surface, the third slot being structured to receive the fastener at least along a third axis that is central to the third slot, the third slot being positioned such that a distance between the third axis and the first axis is greater than another distance between the second axis and the first axis, wherein, the central axis of the attachment member is configured to align with a drive axis of the driving shaft when the locking member is in the locked position, and the attachment member includes a plurality of ribs on the surface of the attachment member, the plurality of ribs including (a) an inner rib that extends around the inner region of the attachment member, (b) an outer rib that extends around the edge of the attachment member, and (c) a radial rib that extends from the inner rib to the outer rib.

2. The accessory of claim 1, wherein:

the attachment member moves in at least a spinning motion when rotating about the central axis; and the attachment member moves in at least a random orbital notion when rotating about the eccentric axis.

3. The accessory of claim 1, further comprising:

a bearing, wherein the fastener connects at least the bearing to the eccentric member and the attachment member such that the bearing is centered about the eccentric axis.

4. The accessory of claim 3, wherein the bearing is disposed within the guide slot between the fastener and the second protruding structure.

5. The accessory of claim 1, further comprising:

a constraint mechanism that holds a part of the attachment member such that the attachment member moves in at least an orbital motion when driven by the driving shaft.

6. The accessory of claim 1, wherein the eccentric member provides the first slot, the second slot, and the third slot in an arrangement such that the second axis is between the first axis and the third axis.

7. The accessory of claim 1, wherein:

the second side surface is opposite to the first side surface; and a length of the shaft portion of the lock member is longer along a vertical dimension than a thickness of the eccentric member from the first side surface to the second side surface.

8. An apparatus comprising:

a driving shaft;

a motor to drive the driving shaft; and an accessory drivable by the driving shaft, the accessory including an attachment member including (a) an inner region including a surface having (i) a first protruding structure that protrudes outward from the surface on a first side of the attachment member in a first direction and defines a locking slot that is offset from a central axis of the attachment member and (ii) a second protruding structure that protrudes outward from the surface and defines a guide slot, the central axis being perpendicular to the surface of the attachment member and (b) an outer region including the surface that extends from the inner region to an edge of the attachment member;

an attachment configured to engage with a work piece, the attachment being detachably attachable to a second side of the attachment member;

a fastener;

a locking member movable into at least (a) a locked position in which the locking member is engaged with the locking slot of the attachment member such that the attachment member is configured to rotate about the central axis, and (b) an unlocked position in which the locking member is disengaged from the locking slot of the attachment member such that the attachment member is configured to rotate about an eccentric axis, the eccentric axis being offset from the central axis; and an eccentric member having a first side surface and a second side surface, the eccentric member including (a) a first slot that is defined as a through-hole from the first side surface to the second side surface, the first slot being structured to receive the locking member at least along a first axis that is central to the first slot, (b) a second slot that receives the driving shaft at least along a second axis that is central to the second slot, and (c) a third slot that is defined from the first side surface to the second side surface, the third slot being structured to receive the fastener at least along a third axis that is central to the third slot, the third slot being positioned such that a distance between the third axis and the first axis is greater than another distance between the second axis and the first axis, wherein the fastener extends through the guide slot of the attachment member and the third slot of the eccentric member to provide a secure connection between the attachment member and the eccentric member along the eccentric axis, the central axis of the attachment member is configured to align with a drive axis of the driving shaft when the locking member is in the locked position, and the attachment member includes a plurality of ribs on the surface of the attachment member, the plurality of ribs including (a) an inner rib that extends around the inner region of the attachment member, (b) an outer rib that extends around the edge of the attachment member, and (c) a radial rib that extends from the inner rib to the outer rib.

9. The apparatus of claim 8, wherein:

the attachment member moves in at least a spinning motion when rotating about the central axis; and the attachment member moves in at least a random orbital motion when rotating about the eccentric axis.

10. The apparatus of claim 8, further comprising:

a bearing, wherein the fastener connects at least the bearing to the eccentric member and the attachment member such that the bearing is centered about the eccentric axis.

11. The apparatus of claim 10, wherein the bearing is disposed within the guide slot between the fastener and the second protruding structure.

12. The apparatus of claim 8, further comprising:

a constraint mechanism that holds a region of the attachment member such that the attachment member moves in at least an orbital motion when driven by the driving shaft.

13. An accessory drivable by a driving shaft, the accessory comprising:

an attachment member including (a) an inner region including a surface having (i) a first protruding structure that protrudes outward from the surface on a first side of the attachment member in a first direction and defines a locking slot that is offset from a central axis of the attachment member and (ii) a second protruding structure that protrudes outward from the surface in the first direction and defines a guide slot that is offset from the central axis of the attachment member, the central axis being perpendicular to the surface of the attachment member and (b) an outer region including the surface that extends from the inner region to an edge of the attachment member;

an attachment configured to engage with a work piece, the attachment being detachably attachable to a second side of the attachment member;

a fastener;

a locking member movable into at least (a) a locked position in which the locking member is engaged with the locking slot of the attachment member such that the attachment member is configured to rotate about the central axis, and (b) an unlocked position in which the locking member is disengaged from the locking slot of the attachment member such that the attachment member is configured to rotate about an eccentric axis, the eccentric axis being offset from the central axis; and an eccentric member having a first side surface and a second side surface, the eccentric member including (a) a first slot defined as a through-hole from the first side surface to the second side surface, the first slot being structured to receive the locking member at least along a first axis that is central to the first slot, (b) a second slot to receive the driving shaft at least along a second axis that is central to the second slot, and (c) a third slot defined from the first side surface to the second side surface, the third slot being structured to receive the fastener at least along a third axis that is central to the third slot, the third slot being positioned such that a distance between the third axis and the first axis is greater than another distance between the second axis and the first axis, wherein the fastener extends through the guide slot of the attachment member and the third slot of the eccentric member to provide a secure connection between the attachment member and the eccentric member along the eccentric axis, and the locking member is movable into the locked position and the unlocked position along an axis that is parallel to the central axis.

14. The accessory of claim 13, wherein:

the attachment member moves in at least a spinning motion when rotating about the central axis; and the attachment member moves in at least a random orbital motion when rotating about the eccentric axis.

15. The accessory of claim 13, wherein the central axis of the attachment member aligns with a drive axis of the driving shaft when the locking member is in the locked position.

16. The accessory of claim 13, further comprising:

a bearing, wherein the fastener connects at least the bearing to the eccentric member and the attachment member such that the bearing is centered about the eccentric axis.

17. The accessory of claim 16, wherein the bearing is disposed within the guide slot between the fastener and the second protruding structure.

18. The accessory of claim 13, further comprising:

a constraint mechanism that holds a part of the attachment member such that the attachment member moves in at least an orbital motion when driven by the driving shaft.

19. The accessory of claim 13, wherein the eccentric member provides the first slot, the second slot, and the third slot in an arrangement such that the second axis is between the first axis and the third axis.

20. The accessory of claim 13, wherein the attachment member includes a plurality of ribs on the surface of the attachment member, the plurality of ribs including (a) an inner rib that extends around the inner region of the attachment member, (b) an outer rib that extends around the edge of the attachment member, and (c) a radial rib that extends from the inner rib to die outer rib.

* * * * *

UNITED STATES PATENT AND TRADEMARK OFFICE
CERTIFICATE OF CORRECTION

PATENT NO. : 11,964,352 B2
APPLICATION NO. : 15/896484
DATED : April 23, 2024
INVENTOR(S) : Rubens et al.

It is certified that error appears in the above-identified patent and that said Letters Patent is hereby corrected as shown below:

In the Claims

In Claim 1, at Column 10, Line 35: "Air accessory" should read --An accessory--.

In Claim 1, at Column 10, Lines 39-40: "a flat side of the attachment member" should read --a first side of the attachment member--.

In Claim 1, at Column 11, Line 5: "the second side, surface" should read --the second side surface--.

In Claim 2, at Column 11, Lines 25-26: "random orbital notion" should read --random orbital motion--.

In Claim 20, at Column 14, Line 41: "die outer rib" should read --the outer rib--.

Signed and Sealed this
First Day of October, 2024

Katherine Kelly Vidal
*Director of the United States Patent and Trademark Office*